(12) United States Patent
Rajakari et al.

(10) Patent No.: US 12,302,919 B2
(45) Date of Patent: May 20, 2025

(54) WHEY PREPARATION OBTAINED BY CAVITATION AND USES THEREOF

(71) Applicant: VALIO LTD, Helsinki (FI)

(72) Inventors: Kirsi Rajakari, Espoo (FI); Päivi Myllärinen, Helsinki (FI)

(73) Assignee: Valio Ltd, Helsinki (FI)

( * ) Notice: Subject to any disclaimer, the term of this patent is extended or adjusted under 35 U.S.C. 154(b) by 0 days.

(21) Appl. No.: 18/213,439

(22) Filed: Jun. 23, 2023

(65) Prior Publication Data

US 2023/0329265 A1    Oct. 19, 2023

Related U.S. Application Data

(62) Division of application No. 15/929,311, filed on Apr. 24, 2020, now abandoned, which is a division of
(Continued)

(30) Foreign Application Priority Data

Aug. 31, 2015    (FI) ........................ 20155621

(51) Int. Cl.
 *A23C 21/00*    (2025.01)
 *A23C 9/13*    (2006.01)
(Continued)

(52) U.S. Cl.
 CPC ............ *A23C 21/00* (2013.01); *A23C 9/1307* (2013.01); *A23C 9/1422* (2013.01);
(Continued)

(58) Field of Classification Search
 CPC .................. A23C 21/00; A23C 9/1307; A23C 9/1422–1427; A23C 19/053;
(Continued)

(56) References Cited

U.S. PATENT DOCUMENTS 2,882,025 A    4/1959    Loo
3,743,523 A    7/1973    Bodine
(Continued)

FOREIGN PATENT DOCUMENTS

EP    1 292 196    8/2007
RU    2 550 253    5/2015
(Continued)

OTHER PUBLICATIONS

Translation of WO 2008/055592A1 (Year: 2008).*
(Continued)

*Primary Examiner* — Drew E Becker
(74) *Attorney, Agent, or Firm* — Nixon & Vanderhye PC

(57) ABSTRACT

The present invention relates to a process for microparticulating of an ideal whey protein in a solution. The present invention relates also to microparticulated ideal whey protein preparation. In addition, the present invention relates to use of the microparticulated ideal whey protein preparation in milk based products and/or dairy products. Further, the present invention relates to a milk based product and/or a dairy product containing a microparticulated whey protein preparation.

22 Claims, 2 Drawing Sheets

| Line | Sample |
|---|---|
| MW | STD (Bio-Rad #161-0373) |
| 1 | Ideal whey protein concentrate |
| 2 | Ideal whey protein concentrate microparticulated with LeanCreme™-process (SPX, USA) |
| 3 | Pasteurized ideal whey protein concentrate microparticulated with LeanCreme™-process (SPX, USA) |
| 4 | Ideal whey protein concentrate microparticulated by cavitation with APV-cavitator (SPX, USA) |

Related U.S. Application Data application No. 15/755,343, filed as application No. PCT/FI2016/050604 on Aug. 31, 2016, now Pat. No. 10,667,539.

(51) Int. Cl.
- A23C 9/142 (2006.01)
- A23C 19/05 (2006.01)
- A23C 21/06 (2006.01)
- A23J 3/08 (2006.01)
- A23J 3/10 (2006.01)

(52) U.S. Cl.
CPC ............ *A23C 19/053* (2013.01); *A23C 21/06* (2013.01); *A23J 3/08* (2013.01); *A23J 3/10* (2013.01); *A23V 2250/54252* (2013.01); *A23V 2300/08* (2013.01); *A23V 2300/24* (2013.01); *A23V 2300/31* (2013.01); *A23V 2300/34* (2013.01)

(58) Field of Classification Search
CPC ......... A23C 21/06; A23C 9/00; A23C 9/1512; A23J 3/08; A23J 3/10; A23J 1/205; A23V 2250/54252; A23V 2300/08; A23V 2300/24; A23V 2300/31; A23V 2300/34; A01J 11/16
See application file for complete search history.

(56) References Cited

U.S. PATENT DOCUMENTS

| | | | |
|---|---|---|---|
| 4,675,194 A | 6/1987 | Gaffney | |
| 4,734,287 A | 3/1988 | Singer | |
| 4,961,953 A | 10/1990 | Singer | |
| 5,096,731 A * | 3/1992 | Singer | A23J 3/00 426/583 |
| 5,217,741 A | 6/1993 | Kawachi | |
| 5,366,751 A | 11/1994 | Pordy | |
| 5,601,760 A | 2/1997 | Rosenberg | |
| 5,714,182 A * | 2/1998 | Bisson | A23C 19/053 426/38 |
| 6,261,624 B1 | 7/2001 | Hudson | |
| 6,511,695 B1 | 1/2003 | Paquin et al. | |
| 7,811,620 B2 | 10/2010 | Merrill et al. | |
| 8,430,968 B2 | 4/2013 | Mancosky et al. | |
| 10,834,934 B2 * | 11/2020 | Mikkelsen | A23J 3/08 |
| 2002/0155208 A1 | 10/2002 | Benjamins et al. | |
| 2003/0087001 A1 * | 5/2003 | Stuchell | A23C 13/14 426/41 |
| 2003/0170353 A1 | 9/2003 | Van Vliet | |
| 2003/0219510 A1 | 11/2003 | Kent et al. | |
| 2004/0062846 A1 * | 4/2004 | Sargent | A23L 9/22 426/601 |
| 2004/0156979 A1 * | 8/2004 | Villagran | A23F 5/243 426/656 |
| 2006/0204643 A1 * | 9/2006 | Merrill | A23G 3/44 426/656 |
| 2007/0178209 A1 | 8/2007 | Bialek et al. | |
| 2008/0038424 A1 | 2/2008 | Krusemann | |
| 2010/0047423 A1 * | 2/2010 | Kruesemann | A23C 3/0337 426/519 |
| 2011/0262608 A1 * | 10/2011 | Burger | A23J 3/08 99/453 |
| 2011/0278153 A1 | 11/2011 | Bates et al. | |
| 2012/0029165 A1 * | 2/2012 | Etzel | A23J 1/205 530/394 |
| 2012/0225172 A1 | 9/2012 | Bates et al. | |
| 2014/0296162 A1 † | 10/2014 | Van Der Zande | |
| 2015/0176836 A1 | 6/2015 | Griggs | |
| 2015/0230423 A1 | 8/2015 | Kjolby et al. | |
| 2015/0237909 A1 | 8/2015 | Niesmiejanow | |
| 2016/0262424 A1 * | 9/2016 | Mikkelsen | A23C 21/06 |
| 2017/0311635 A1 | 11/2017 | Mimouni et al. | |
| 2017/0318828 A1 * | 11/2017 | Jensen | A23C 21/06 |

FOREIGN PATENT DOCUMENTS

| | | |
|---|---|---|
| WO | 94/13148 | 6/1994 |
| WO | 2006/058538 | 6/2006 |
| WO | 2007/136263 | 11/2007 |
| WO | 2008/055592 | 5/2008 |
| WO | WO2010012032 † | 2/2010 |
| WO | 2013/065014 | 5/2013 |
| WO | 2014/087054 | 6/2014 |
| WO | 2015/059245 | 4/2015 |
| WO | 2015/059246 | 4/2015 |
| WO | 2015/059248 | 4/2015 |
| WO | 2016/063101 | 4/2016 |

OTHER PUBLICATIONS

Abstract for RD 595029A (Year: 2013).
Abstract for RD 611035A (Year: 2015).
Abstract for RU 2010103072A (Year: 2011).
Anonymous, "Hydrodynamic Cavitation Applications in Food, Beverage and Personal Care" *Research Disclosure*, database No. 595029 (2013).
Dissanayake, *Modulation of Functional Properties of Whey Proteins by Microparticulation*, Thesis, pp. i-285 (2011).
Finnish Office Action issued in U.S. Appl. No. 20/155,621 dated Feb. 22, 2016.
Gogate, "Hydrodynamic Cavitation for Food and Water Processing" *Food and Bioprocess Technology*, vol. 4: 996-1011 (2010).
International Preliminary Report on Patentability issued in PCT/FI2016/050604 dated Mar. 6, 2018.
International Search Report issued in PCT/FI2016/050604 dated Jan. 24, 2017.
Koh et al., "A Comparison of the Effectiveness of Sonication, High Shear Mixing and Homogensiation on Improving the Heat Stability of Whey Protein Solutions" *Food and Bioprocess Technology*, vol. 7: 556-566 (2014).
Maubois, "New Technologies and Innovation in Milk Processing" *1st International Symposium of Dairy Cattle*, pp. 175-186 (2011), XP-002765261.
Meletharayil et al., "Influence of hydrodynamic cavitation on the rheological properties and microstructure of formulated Greek-style yoghurts" *Journal of Dairy Science*, vol. 99, No. 11: 8537-8548 (2016).
Mleko et al., "Formation of Whey Protein Polymers: Effects of A Two-step Heating Process on Rheological Properties" *Journal of Texture Studies*, vol. 30: 137-149 (1999), XP-002765262.
Molecular Mass Distributions of Heat-Induced B-Lactoglobulin Aggregates, Marion Hoffman et al., 1997 American Chemical Society (Year: 1997).
Office Action issued in RU Appln. No. 2018111397 dated Dec. 27, 2018 (w/ translation).
RD 595029 (Year: 2013).
RD 611035 (Year: 2015).
SPX Corporation—Skindersoe, "Microparticulation of Whey Proteins—Applications in Dairy" Presentation at Inofood Expo, Santiago, Chile (2011), XP-002765260.
SPX Corporation, "APV Cavitator Technology in Functionalisation of WPC and other Food Ingredients" (2013), XP-002765259.
SPX Corporation, "Cavitation Technology for Dairy Powder Processing" (2015).
SPX Corporation, "Cavitation Technology for Yoghurt Processing" (2015).
Horiuchi, H., A method for manufacturing superior set yogurt under reduced oxygen conditions, J. Dairy Sci. 92 :4112-4121, 2008-1747 (2009).†
Olivier, Celso Eduardo, In search of a tolerance-induction strategy for cow's milk allergies: significant reduction of beta-lactoglobulin allergenicity via transglutaminase/cysteine polymerization, Clinics 2012;67(10):1171-1179 (2012).†

\* cited by examiner
† cited by third party

| Line | Sample |
|---|---|
| MW | STD (Bio-Rad #161-0373) |
| 1 | Ideal whey protein concentrate |
| 2 | Ideal whey protein concentrate microparticulated with LeanCreme™-process (SPX, USA) |
| 3 | Pasteurized ideal whey protein concentrate microparticulated with LeanCreme™-process (SPX, USA) |
| 4 | Ideal whey protein concentrate microparticulated by cavitation with APV-cavitator (SPX, USA) |

| Line No. | Sample |
|---|---|
| 1 | STD (Bio-Rad #161-0373) |
| 2 | ideal whey protein |
| 3 | Trial 4 |
| 4 | Trial 5 |
| 5 | Trial 6 |
| 6 | Trial 7 |
| 7 | Trial 8 |
| 8 | Trial 9 |
| 9 | Trial 11 |

WHEY PREPARATION OBTAINED BY CAVITATION AND USES THEREOF

This application is a Divisional of U.S. application Ser. No. 15/929,311 filed Apr. 24, 2020 (now abandoned), which is a Divisional of U.S. application Ser. No. 15/755,343 filed Feb. 26, 2018 (now U.S. Pat. No. 10,667,539), which is the U.S. national phase of International Application No. PCT/FI2016/050604 filed Aug. 31, 2016, which designated the U.S. and claims the benefit of FI application No. 20155621 filed Aug. 31, 2015, the entire contents of each of which are hereby incorporated by reference.

FIELD OF THE INVENTION

The present invention relates to a process for microparticulating of ideal whey protein. The present invention relates also to a microparticulated ideal whey protein preparation. In addition, the present invention relates to use of the microparticulated ideal whey protein preparation in milk based products and/or dairy products and to a method for manufacturing milk based and/or dairy products using a microparticulated ideal whey protein preparation in the manufacture. Further, the present invention relates to a milk based product and/or a dairy product containing microparticulated ideal whey protein preparation.

BACKGROUND OF THE INVENTION

Typically microparticulated whey protein is produced from a whey protein concentrate (WPC) solution by physically shearing the solution during heating using a scraped-surface heat exchanger. Commercially available products such as LeanCreme™ (SPX Corporation, USA) and Simplesse (CP Kelco, USA) are used as a heat-stable whey protein and as a fat substitute in foods, such as cheeses, ice cream and beverages, for example. The problem related to these traditionally produced microparticulated whey protein products is that they do not produce a creamy texture and/or taste into acidified milk products.

BRIEF DESCRIPTION OF THE INVENTION

The present invention relates to a process for microparticulating of ideal whey protein. The present invention relates also to microparticulated ideal whey protein preparation. In addition, the present invention relates to use of the microparticulated ideal whey protein preparation in milk based products and/or dairy products. The present invention relates also to a method for manufacturing milk based and/or dairy products using a microparticulated ideal whey protein preparation in the manufacture. Further, the present invention relates to a milk based product and/or a dairy product containing microparticulated ideal whey protein.

The microparticulated ideal whey protein of the present invention contains or comprises β-lactoglobulin (β-LG) polymers having a size of >200 kDa. The microparticulated ideal whey protein of the present invention has particle size of 1-200 μm. The taste of the microparticulated ideal whey protein is creamy and full-flavored. It is well suited for use in the manufacturing of milk based products and/or dairy products, especially acidified milk based and/or dairy products.

The objects of the invention are achieved by methods/products and uses characterized by what is stated in the independent claims. The preferred embodiments of the invention are disclosed in the dependent claims.

DETAILED DESCRIPTION OF THE INVENTION

Figure 1:
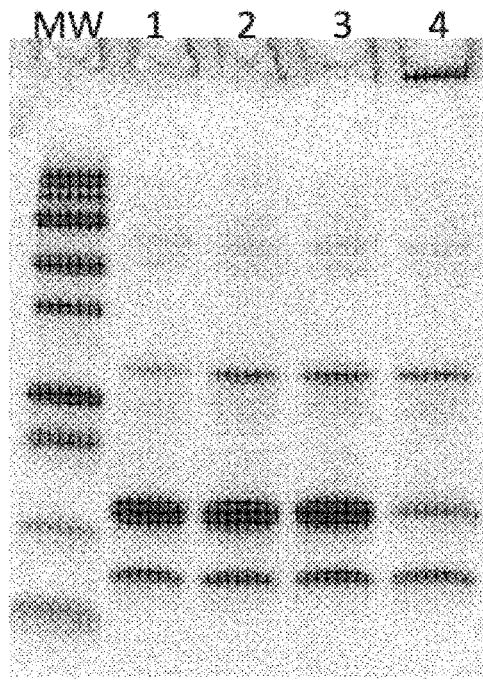
FIG. 1 shows SDS-PAGE-results of different microparticulated whey proteins:
Line MW shows the bands of Bio-Rad #161-0373-standard.
Line 1 shows the bands of an ideal whey protein concentrate.
Line 2 shows the bands of an ideal whey protein concentrate microparticulated with LeanCreme™-process (SPX, USA).
Line 3 shows the bands of a pasteurized ideal whey protein concentrate microparticulated with LeanCreme™-process (SPX, USA).
Line 4 shows the bands of an ideal whey protein concentrate microparticulated by cavitation with APV-cavitator (SPX, USA).

The problem related to known microparticulated whey proteins produced by homogenizing preheated whey protein concentrate (WPC) at a high pressure and extruding then the whey proteins in acidic conditions, is that they do not produce a creamy texture and/or taste into milk based/dairy products, especially to acidified milk based/dairy products.

The present invention is based on a finding that microparticulating ideal whey protein with a cavitator produced microparticulated ideal whey protein preparation having a creamy and thick texture. In addition, when this microparticulated ideal whey protein preparation was used in the manufacture of yogurt, a creamy and thick yogurt, creamier and thicker than a reference yogurt produced without the microparticulated ideal whey protein product, was produced. Accordingly, it is possible to produce low-fat or fat-free acidified milk based products/dairy products, which have creamy taste and texture with the microparticulated ideal whey protein preparation of the present invention. The microparticulated ideal whey protein preparation can be used as such and/or as a fat substitute, for example, also in neutral dairy products as well as other foodstuffs.

In the method of the present invention, an ideal whey protein preparation, which contains native whey proteins, was cavitated with APV-cavitator (SPX, USA) using the following operating values: 150-200 l/h, 50-60 Hz, cavitation time 10-60 s, the clearance of the cavitator 3 mm (radial), holes in four (1-4) lines. The ideal whey protein preparation was preheated to a temperature of 25-67° C. and during the cavitation the temperature rose up to 73-93° C. After this, the microparticulated ideal whey protein was cooled to a temperature up to 10° C. using a scraped-surface heat exchanger.

As a result of the cavitation procedure, a thick/viscous light brownish microparticulated ideal whey protein preparation having particle size of 1-200 μm, was achieved. The taste of the microparticulated ideal whey protein preparation was creamy and full-flavored. In addition, it was found that when the microparticulated ideal whey protein preparation was used in manufacturing yogurt, full-flavored, smooth and creamy yogurt with no wheying-off or syneresis during the storage was achieved.

Accordingly, the present invention relates to a process for microparticulating of ideal whey protein. In one embodiment, the present invention relates to a process for microparticulating of an ideal whey protein preparation by cavitation. The present invention relates also to a microparticulated ideal whey protein preparation. In one embodiment, the present invention relates to an ideal whey protein preparation microparticulated by cavitation. In addition, the present invention relates to use of a microparticulated ideal whey protein preparation in a milk based product and/or a dairy product. In one embodiment, the present invention relates to use of an ideal whey protein preparation microparticulated by cavitation in a milk based product and/or a dairy product. Further, the present invention relates to a milk based product and/or a dairy product containing microparticulated ideal whey protein. In one embodiment, the present invention relates to a milk based product and/or a dairy product containing an ideal whey protein preparation microparticulated by cavitation.

The ideal whey protein preparation used in the present invention contains whey proteins in their native form (i.e., ideal whey proteins) and β-caseins, β-lactoglobulin ja α-lactalbumin (α-La). In one embodiment, the ideal whey protein preparation contains β-lactoglobulin about 5.0 to about 8.0 g/100 g. In one embodiment, the ideal whey protein preparation contains β-lactoglobulin about 5.0 to about 6.0 g/100 g. In one embodiment, the preparation contains β-lactoglobulin in an amount of about 5.5 g/100 g. In one embodiment, the ideal whey protein preparation contains α-lactalbumin less than or at most about 2.0 g/100 g. In one embodiment, the ideal whey protein preparation contains α-lactalbumin about 1.0 to about 2.0 g/100 g. In one embodiment, the preparation contains α-lactalbumin in an amount of about 1.8 g/100 g. In one embodiment, the ideal whey preparation contains β-lactoglobulin, α-lactalbumin and casein in a ratio of 0.7/0.23/0.07 β-LG/α-La/casein. In one embodiment, the ratio is 0.9/0.03/0.07 β-LG/α-La/casein. The casein referred herein is mainly β-casein. The pH of the ideal whey protein preparation is in the range of 6.5-7. In one embodiment, the pH of the ideal whey protein preparation is about 6.7. The ideal whey protein preparation is obtained as a microfiltration permeate of a milk raw material. The microfiltration permeate can be further treated and/or concentrated by membrane filtration (ultrafiltration, reverse osmose, nanofiltration) and/or evaporation, for example. The term "an ideal whey protein preparation" refers to a microfiltration (MF) permeate obtained from microfiltration of a milk raw material. The term "an ideal whey protein preparation" is understood to encompass also a concentrated form of the MF permeate which is obtained, for example, as an ultrafiltration retentate from ultrafiltration of the MF permeate. The ideal whey protein preparation can be produced by a process which comprises the steps of:

subjecting a milk raw material to microfiltration to separate the ideal whey proteins as a microfiltration permeate and a casein concentrate as a microfiltration retentate, optionally subjecting at least a portion of the microfiltration permeate to ultrafiltration to provide an ultrafiltration permeate and an ideal whey protein concentrate as an ultrafiltration retentate, optionally evaporating at least a portion of the microfiltration permeate and/or the ultrafiltration retentate, optionally drying at least a portion of the microfiltration permeate and/or the ultrafiltration retentate, and/or the evaporate, providing the microfiltration permeate or the ultrafiltration retentate of the microfiltration permeate or the evaporated microfiltration permeate or the evaporated ultrafiltration retentate of the microfiltration permeate or the dried microfiltration permeate or the dried ultrafiltration retentate of the microfiltration permeate as the ideal whey protein preparation.

Accordingly, in the present invention, the ideal whey protein preparation can be in the form of a solution or in the form of an evaporate (concentrate) or in the form of a powder. In one embodiment, the ideal whey protein preparation is in the form of a solution or in the form of a concentrate. In one embodiment, the ideal whey protein preparation is in the form of a powder.

The milk raw material may be, for instance, full-fat milk, cream, low-fat milk or skim milk, lactose-free or low-lactose milk, protease treated milk, recombined milk from milk powder, organic milk or a combination of these, or a dilution of any of these. Milk can originate from a cow, sheep, goat, camel, horse or any other animal producing milk suitable for nourishment. In one embodiment, the milk raw material is skimmed milk. In another embodiment, the milk raw material is low lactose or lactose-free milk. In a further embodiment, the milk raw material is low lactose or lactose-free skimmed milk.

In one embodiment, the ideal whey protein preparation can be prepared by microfiltrating skimmed milk and concentrating the obtained microfiltration permeate by ultrafiltration. Microfiltration of the skimmed milk is typically carried out at a temperature of about 2° C. to about 55° C. In one embodiment, the microfiltration is carried out at about 10° C. Ultrafiltration is typically performed at about 5° C. to about 55° C. In one embodiment, the ultrafiltration is carried at about 10° C.

The ideal whey protein preparation contains β-casein, about 20% of the total protein, but it does not contain micellar casein monomers or any other by-products from the cheese manufacture, i.e., it is free of caseinomacropeptides and thermally formed k-casein β-lactoglobulin complexes. The protein content of the ideal whey protein preparation can range from about 4% to about 90%. In an embodiment, the protein content of the preparation is about 9% and β-casein content is about 20% based on total protein. In another embodiment, the protein content of the preparation is about 16% and β-casein content is about 20% based on total protein. The ideal whey protein preparation contains more α-lactalbumin and β-lactoglobulins in total whey protein than whey protein concentrate (WPC) manufactured from cheese whey because the caseinomacropeptide fraction does not exist in the ideal whey protein preparation. The lactose content of the ideal whey protein preparation can be reduced, if desired. The lactose removal can be accomplished with methods known in the art, for example. In one embodiment, the ideal whey protein preparation is in the form of an ideal whey protein solution, which contains about 7% whey protein, about 1.8% casein, about 2.3% lactose, about 0.47% ash, and the dry matter of the solution being about 12.2%. In another embodiment, the ideal whey protein preparation is in the form of an ideal whey protein powder which contains about 88% whey protein, about 0% casein, about 0% lactose, about 3% ash, and the dry matter of the preparation being about 90%. When ideal whey protein in powder form is used in the preparation of the microparticulated ideal whey protein preparation, optional steps of adding a suitable liquid and/or dissolving the powder, known by a skilled person, are included in the method of the present invention. Functional properties of whey proteins are better maintained when the drying step does not exist in the manufacturing process of the ideal whey protein preparation. The taste of the ideal whey protein preparation is pleasant and clean due to the mild heat-treatment performed at temperature below 75° C., most typically at 72° C. for 15 seconds. Additionally, ideal whey protein preparation does not carry any of the associated off-flavors because it is not derived from cheese production.

The present invention relates to a process for producing a microparticulated ideal whey protein preparation. In one embodiment, the present invention relates to a process for producing a microparticulated ideal whey protein preparation by cavitation. In one embodiment, the method comprises the steps of:
providing an ideal whey protein preparation,
providing a cavitator,
optionally preheating the ideal whey protein preparation,
treating the optionally preheated ideal whey protein preparation in the cavitator for providing the microparticulated ideal whey protein preparation.

In one embodiment, the ideal whey protein preparation is preheated to the temperature of 25-67° C. In one embodiment, the ideal whey protein solution is preheated to a temperature of 48-67° C. In another embodiment, the ideal whey protein solution is preheated to a temperature of about 61-67° C. In one embodiment, the temperature at the output of the cavitator is in the range of about 73-93° C. In one embodiment, the temperature at the output of the cavitator is in the range of about 77-93° C. In another embodiment, the temperature at the output of the cavitator is in the range of about 73-85° C. In one embodiment, the temperature at the output of the cavitator is the range of 77-85° C. In one embodiment, the ideal whey protein solution is preheated to a temperature of about 48-67° C. and the temperature at the output of the cavitator is in the range of about 73-85° C.

In one embodiment, the frequency in the cavitator is in the range of about 50-60 Hz. In another embodiment, the frequency in the cavitator is in the range of about 52-56 Hz.

In one embodiment, the cavitation time is about 3-60 s. In another embodiment, the cavitation time is about 10-60 s. In one embodiment, the cavitation time is about 10-30 s. In one embodiment, the cavitation time is about 30-60 s. In one embodiment, the cavitation time is about 30 s.

It was found in the present invention, that the temperature at the output of the cavitator and the cavitation frequency, for example, were important to the polymerization of the ideal whey protein, especially for the polymerization of the β-lactoglobulins.

In one embodiment, the microparticulated ideal whey protein is cooled to a temperature up to 10° C. In another embodiment, the microparticulated ideal whey protein is cooled to a temperature of about 4° C.

In one embodiment, the produced microparticulated ideal whey protein preparation is in the form of a solution. In this embodiment, the method for producing a microparticulated ideal whey protein preparation further comprises an optional step of:
concentrating the microparticulated ideal whey protein solution to provide a microparticulated ideal whey protein concentrate.

In one embodiment, the microparticulated ideal whey protein preparation in a solution or a concentrate form is dried and a microparticulated ideal whey protein in powder form is provided.

The method of the present invention provides a microparticulated ideal whey protein preparation, wherein the whey proteins have a particle size of 1-200 μm, 1-100 μm, 1-10 μm, 5-10 μm or 1-2 μm. In one embodiment, the whey proteins have a particle size of 1-10 μm. The microparticulated ideal whey protein preparation contains also β-caseins, β-lactoglobulin and α-lactalbumin (α-La). The microparticulated ideal whey protein preparation contains β-casein, about 20% of the total protein. It is free of caseinomacropeptides and thermally formed k-casein β-lactoglobulin complexes. In one embodiment, the microparticulated ideal whey protein preparation contains β-lactoglobulin about 5.0 to about 8.0 g/100 g. In one embodiment, the ideal whey protein preparation contains 3-lactoglobulin about 5.0 to about 6.0 g/100 g. In one embodiment, the preparation contains β-lactoglobulin in an amount of about 5.5 g/100 g. In one embodiment, the microparticulated ideal whey protein preparation contains α-lactalbumin less than or at most about 2.0 g/100 g. In one embodiment, the ideal whey protein preparation contains α-lactalbumin about 1.0 to about 2.0 g/100 g. In one embodiment, the preparation contains α-lactalbumin in an amount of about 1.8 g/100 g. In one embodiment, the microparticulated ideal whey preparation contains 3-lactoglobulin, α-lactalbumin and casein in a ratio of 0.7/0.23/0.07 β-LG/α-La/casein. In one embodiment, the ratio is 0.9/0.03/0.07 β-LG/β-La/casein. The casein referred herein is mainly β-casein. The pH of the microparticulated ideal whey protein is in the range of 6.5-7. In one embodiment, the pH of the preparation is about 6.7.

The protein content of the microparticulated ideal whey protein preparation can range from about 4% to about 90%. In an embodiment, the protein content of the preparation is about 9% and β-casein content is about 20% based on total protein. In another embodiment, the protein content of the preparation is about 16% and β-casein content is about 20% based on total protein. The β-lactoglobulin, or at least part of it, is in a polymerized form in the microparticulated ideal whey protein preparation of the present invention. The β-lactoglobulin polymers have a size of >200 kDa. This is a unique feature in a microparticulated ideal whey protein preparation of the present invention. In one embodiment, about 30% of β-lactoglobulins is in the polymerized form in the microparticulated ideal whey protein preparation. In one embodiment, at least 30% of β-lactoglobulins is in the polymerized form in the microparticulated ideal whey protein preparation. In one embodiment, at least 33% of β-lactoglobulins is in the polymerized form in the microparticulated ideal whey protein preparation. In one embodiment, about 50% of β-lactoglobulins is in the polymerized form in the microparticulated ideal whey protein preparation. In one embodiment, about 99% of β-lactoglobulins is in the polymerized form in the microparticulated ideal whey protein preparation. In one embodiment, about 30% to about 99% of β-lactoglobulins is in the polymerized form in the microparticulated ideal whey protein preparation. In one embodiment, about 33% to about 99% of β-lactoglobulins is in the polymerized form in the microparticulated ideal whey protein preparation. In one embodiment, about 30% to about 50% of β-lactoglobulins is in the polymerized form in the microparticulated ideal whey protein preparation. In one embodiment, about 50% to about 99% of β-lactoglobulins is in the polymerized form in the microparticulated ideal whey protein preparation.

In one embodiment, the microparticulation of the ideal whey protein preparation is performed by cavitation. The β-lactoglobulin, or at least part of it, is in a polymerized form in the ideal whey protein preparation microparticulated by cavitation. The β-lactoglobulin polymers have a size of >200 kDa. This is a unique feature in a microparticulated ideal whey protein produced by cavitation, since no polymerization has been detected in microparticuated whey protein produced by traditional methods. In one embodiment, about 30% of β-lactoglobulins is in the polymerized form in the microparticulated ideal whey protein preparation produced by cavitation. In one embodiment, at least 30% of β-lactoglobulins is in the polymerized form in the microparticulated ideal whey protein preparation produced by cavitation. In one embodiment, at least 33% of β-lactoglobulins is in the polymerized form in the microparticulated ideal whey protein preparation produced by cavitation. In one embodiment, about 50% of (β-lactoglobulins is in the polymerized form in the microparticulated ideal whey protein preparation produced by cavitation. In one embodiment, about 99% of (β-lactoglobulins is in the polymerized form in the microparticulated ideal whey protein preparation produced by cavitation. In one embodiment, about 30% to about 99% of β-lactoglobulins is in the polymerized form in the microparticulated ideal whey protein preparation produced by cavitation. In one embodiment, about 33% to about 99% of (β-lactoglobulins is in the polymerized form in the microparticulated ideal whey protein preparation produced by cavitation. In one embodiment, about 30% to about 50% of β-lactoglobulins is in the polymerized form in the microparticulated ideal whey protein preparation produced by cavitation. In one embodiment, about 50% to about 99% of β-lactoglobulins is in the polymerized form in the microparticulated ideal whey protein preparation produced by cavitation.

In the ideal whey protein, the denaturation level of β-lactoglobulin is near 0%. On the other hand, in the microparticulated ideal whey protein preparation of the present invention, the denaturation level of (β-lactoglobulin is in the range of 90-95%. In one embodiment, the denaturation level of (β-lactoglobulin is in the range of 92-94%. Thus the polymerization level of β-lactoglobulin in the ideal whey protein preparation microparticulated by cavitation is >33%. Without wishing to be bound to any theory, it seems that microparticulation of ideal whey protein by cavitation produces more fibrous form of protein compared to milk proteins in general, which is then metabolized more slowly in the gut system and its energy value is lower than that of normal milk protein.

The pH of the microparticulated ideal whey protein preparation of the present invention is in the range of about 6.5-7. In one embodiment, the pH is about 6.7.

The viscosity of microparticulated ideal whey protein preparation is in the range of about 200 to about 4000 mPas. In one embodiment, the viscosity of microparticulated ideal whey protein preparation is in the range of about 500 to about 2000 mPas.

The particle size of the microparticulated ideal whey proteins in the preparation is in the range of about 1-200 μm, about 1-100 μm, about 1-10 μm, about 5-10 μm or about 1-2 μm. In one embodiment, the microparticulated ideal whey proteins have a particle size of 1-10 m.

The ideal whey protein preparation microparticulated by cavitation contains β-lactoglobulin polymers having a size of >200 kDa.

In addition, the present invention is directed to a use of a microparticulated ideal whey protein preparation in the manufacture of milk based and/or dairy product. In one embodiment, the texture of the product is thicken by the use the microparticulated ideal whey protein product in and/or during the manufacturing process of the milk based and/or dairy product. In one embodiment, the microparticulated ideal whey protein product is used in the manufacture of an acidified dairy product. In one embodiment, the microparticulated ideal whey protein product is added to the acidified mass in the manufacture of an acidified dairy product.

Further, the present invention relates to a method of producing a milk based product/dairy product, wherein the method comprises a step of using a microparticulated ideal whey protein preparation in the method.

In one embodiment, the method of producing a milk based product/dairy product comprises the steps of:
  providing a milk raw material and an ideal whey protein preparation microparticulated by cavitation,
  heat-treating and cooling the milk raw material,
  adding the microparticulated ideal whey protein preparation to the cooled milk raw material,
  optionally treating the material in a manner characteristic to the milk based product/dairy product,
  optionally packing the product.

In one embodiment, the present invention is directed to a method of producing a neutral, non-acidified milk based product/dairy product, wherein the method comprises a step of using a microparticulated ideal whey protein preparation in the method.

In a certain embodiment, the method of producing a neutral milk based product/dairy product comprises the steps of:
  providing a milk raw material and a microparticulated ideal whey preparation,
  heat-treating and cooling the milk raw material,
  adding the microparticulated ideal whey protein preparation to the cooled milk raw material,
  optionally treating the material in a manner characteristic to the milk based product/dairy product,
  optionally packing the product.

In one embodiment, the present invention is directed to a method of producing an acidified milk based product/dairy product, wherein the method comprises a step of using a microparticulated ideal whey protein preparation in the method.

In a certain embodiment, the method of producing an acidified milk based product/dairy product comprises the steps of:
  providing a milk raw material and a microparticulated ideal whey protein preparation, heat-treating and cooling the milk raw material,
acidifying the cooled milk raw material,
adding the microparticulated ideal whey protein preparation to the acidified milk raw material,
optionally packing the product.

In another embodiment, the method of producing a milk based product/dairy product comprises the steps of:
providing a milk raw material and a microparticulated ideal whey protein preparation,
heat-treating and cooling the milk raw material,
adding the microparticulated ideal whey protein preparation and an acidifier to the cooled milk raw material, acidifying the obtained mixture, mixing the acidified mass,
optionally packing the product.

In a further embodiment, the method of producing a milk based product/dairy product comprises the steps of:
providing a milk raw material and a microparticulated ideal whey protein preparation,
mixing the milk raw material and a microparticulated ideal whey protein preparation,
heat-treating and cooling the mixture,
acidifying the cooled mixture,
mixing the acidified mass,
optionally packing the product.

In the present invention, milk raw material may be milk derived from an animal, such as a cow or a goat, as such or treated in various ways. Milk may be treated by removing, for instance, protein, fat or lactose therefrom, as a result of which low-protein, fat-free, low-fat, lactose-free and/or low-lactose milk is obtained. In this context, raw material milk also refers to, for instance, pre-treated or untreated milks used in the production of yoghurt, viili and fermented milk. In one embodiment, the milk raw material is skimmed milk.

In the manufacture of the dairy product, the optimum conditions for an economic, inexpensive and efficient production process are employed. For example, conventional heat treatment methods such as pasteurization (heating for example at about 72° C. for at least 15 seconds), ESL treatment (heating for example at about 130° C. for 1 to 2 seconds), UHT treatment (heating for example at about 138° C. for 2 to 4 seconds) or high temperature pasteurization (heating at 95° C. for 5 minutes), are employed. In addition, treatments typical in the preparation of a dairy product, such as homogenization, acidification and enzyme treatments, for example, are performed in a manner known in the field.

The present invention also relates to a milk based product/dairy product containing a microparticulated ideal whey protein preparation. In one embodiment, the present invention relates to a milk based product/dairy product containing an ideal whey protein preparation microparticulated by cavitation. Further, the present invention relates to a milk based product/dairy product produced by using said microparticulated ideal whey protein preparation. In one embodiment, the present invention relates to a milk based product/dairy product produced by using said ideal whey protein preparation microparticulated by cavitation.

In the present invention, the term "dairy product" is intended to cover all consumable milk-based products that can be solid and/or jellied. The dairy product can be derived from, e.g., cow's milk, goat's milk, sheep's milk, skimmed milk, whole milk or milk recombined from powdered milk.

The amount of the microparticulated ideal whey protein preparation in the milk based product and/or dairy product is in the range of 1 to 99% based on the weight of the product. In one embodiment, the amount of the microparticulated ideal whey protein preparation in the milk based and/or dairy product is in the range of 10 to 50% based on the weight of the product. In another embodiment, the amount of the microparticulated ideal whey protein preparation in the milk based and/or dairy product is in the range of 20 to 30% based on the weight of the product.

In one embodiment, the milk based product/dairy product is an acidified milk based product/dairy product. In one embodiment of the invention, the microparticulated ideal whey protein preparation of the invention is used in the manufacture of an acidified dairy product. The acidification conditions such as, starter culture(s), temperature, pH and time for the production of acidified milk products or ingredients are selected to meet the requirements of the final product. The selection of suitable conditions belongs to knowledge of a person skilled in the art.

The dairy product could be produced by using the conventional acidification procedures of the dairy industry or alternatively, the product can be soured with a chemical acidifying agent.

In one embodiment, the neutral, non-acidified milk based product/dairy product is selected from a pudding, a beverage/a drink and a protein drink. In one embodiment, the acidified milk based product/dairy product is a sour milk product and/or acidified fresh product. In one embodiment, the acidified milk based product/dairy product selected from yoghurt, quark, tvorog, skyr, Greek yogurt, sour milk, kefir viili, fermented cream, Smetana, sour cream, quark, cottage cheese and feta. In one embodiment, the acidified milk based product/dairy product refers to yogurt. The viscosity of a yogurt of the present invention is in the range of about 200 to about 4000 mPas. In one embodiment, the viscosity of a yogurt of the present invention is about 500 to about 2000 mPas. In one embodiment, the viscosity of a yogurt of the present invention is about 1000 mPas. In one embodiment, the acidified milk based product/dairy product is a drinkable product, such as a drinkable yogurt, sour milk or kefir, for example. The viscosity of an acidified drinkable product is in the range of about 100 to about 250 mPas, depending on the type of the product. In one embodiment, the product is a drinkable yogurt having viscosity in the range of about 150 to about 200 mPas. In one embodiment, the product is a drinkable yogurt having viscosity of about 200 mPas. In one embodiment, the drinkable product is sour milk having viscosity in the range of about 100 to about 150 mPas. In one embodiment, the product is sour milk having viscosity of about 120 mPas. The texture of the product of the present invention is typically thicker than a reference product produced without the microparticulated ideal whey protein product.

In one embodiment, the yogurt is a set-type product, such as a set-type yogurt. In one embodiment, the hardness of a set type product is in the range of about 1000-about 4000 g·mm. In one embodiment, the hardness of a set type product is in the range of about 2000-about 3000 g·mm. In one embodiment, the hardness of a set type product is about 3000 g·mm.

The microparticulated ideal whey protein product of the present invention can be used to substitute a thickening agent, such as pectin, guar gum, xanthan gum, gum arabic and gellan gum, for example in and/or during the manufacturing process of the milk based and/or dairy product. In one embodiment, the microparticulated ideal whey protein product is added to the acidified mass in the manufacture of the acidified dairy product in order to replace a thickener. In one embodiment, the microparticulated ideal whey protein product is mixed with the other starting materials before the acidifying step in the manufacture of the acidified dairy product in order to replace a thickening agent. A thickening agent can be substituted partly or totally by the microparticulated ideal whey protein product of the present invention.

It was found that the microparticulated ideal whey protein preparation of the present invention did not cause any adverse tastes to the products or interfere with the conventional manufacturing processes.

The following examples illustrate the present invention. The examples are not to be construed to limit the claims in any manner whatsoever.

Example 1

Production of Microparticulated Ideal Whey Protein Preparation by Caviation

Ideal whey protein solution (protein 9%) was preheated to a temperature of 27° C. and run through an APV cavitator (SPX, USA) using operating values 56.4 Hz and 200 l/h, lag-time 30 s. The counterpressure of the device was 2.5 bar, wherein the device was made to cavitate in a controlled way. The cavitator has a spinning cylider which has holes in four lines and a clearance of 3 mm. During the cavitation the temperature rose up to 93° C.

In the cavitator, the spinning action generates friction internally in the liquid and the holes generate hydrodynamic cavitation.

After this, the microparticulated ideal whey was cooled to a temperature of 4° C. using a scraped-surface heat exchanger.

As a result, a thick/viscous light brownish microparticulated ideal whey protein preparation having particle size of 1-200 □m was achieved. The taste of the microparticulated ideal whey protein preparation was full-flavored.

Based on the results of SDS-PAGE, it can be seen that part of β-lactoglobulin has polymerized into polymers having a size of >200 kDa (FIG. 1). This a unique feature in a microparticulated whey protein preparation produced by cavitation, since no polymerization has been detected in microparticuated whey protein produced by traditional methods.

Example 2

Production of Fat-Free Yogurt (Reference Example)

The reference yogurt was prepared from skimmed milk, which was pasteurized at 90° C. for 5 minutes and then cooled to the temperature of about 42° C. The starter culture YF-L901 from Chr. Hansen (0.02%) was added and the raw material milk was acidified until the pH was 4.5. After the desired pH was reached, the mass was mixed and treated with YTRON rotor-stator mixer (30 Hz) and cooled to a temperature of about 20° C. The product was packed and cooled to a temperature of about 5° C. in a cold storage.

Example 3

Production of Fat-Free Yogurt from Microparticulated Ideal Whey Protein Concentrate The yogurt was prepared from skimmed milk (72.2%) and the microparticulated ideal whey protein preparation of Example 1 (27.8%). The skimmed milk was pasteurized at 90° C. for 5 minutes and then cooled to the temperature of about 42° C. The starter culture YF-L901 from Chr. Hansen (0.02%) was added and the raw material milk was acidified until the pH was 4.5. After the desired pH was reached, the mass was mixed and treated with YTRON rotor-stator mixer (30 Hz) and cooled to a temperature of about 20° C. The microparticulated ideal whey protein preparation was added and the product was packed and cooled to a temperature of about 5° C. in a cold storage.

The yogurt was full-flavored and creamy whereas the reference yogurt of Example 2 had a watery, not creamy, taste.

The yogurt of the invention was about 5.3 times thicker than the reference yogurt. After one week of storage, the viscosity of the yogurt of the invention was 982 mPas, whereas the viscosity of the reference yogurt produced in Example 2 was 185 mPas. The richness/fullbodiness and smoothness of the yogurt of the invention as well as the difference in the thickness compared to the reference yogurt preserved during the 3-weeks storage period.

There were no wheying-off or syneresis during the storage in the yogurt of the invention.

Example 4

Production of Fat-Free Drinking Yogurt from Microparticulated Ideal Whey Protein Concentrate The drinking yogurt was prepared from skimmed milk (60%) and the microparticulated ideal whey protein preparation of Example 1 (40%). Whey protein preparation replaced pectin addition in the process. The skimmed milk was pasteurized at 90° C. for 5 minutes and then cooled to the temperature of about 42° C. The starter culture YO-MIX 410 from Danisco (0.02%) was added and the raw material milk was acidified until the pH was 4.5. After the desired pH was reached, the mass was mixed and treated with YTRON rotor-stator mixer (30 Hz) and cooled to a temperature of about 20° C. The microparticulated ideal whey protein preparation was added and the product was packed and cooled to a temperature of about 5° C. in a cold storage.

The drinking yogurt was full-flavored and creamy whereas normal drinking yogurt had a watery, not creamy, taste.

The drinking yogurt of the invention was more full bodied than the reference dinking yogurt with pectin. After one week of storage, the viscosity of the drinking yogurt of the invention was 200 mPas, whereas the viscosity of the normal drinking yogurt is 100 mPas. The richness/fullbodiness and smoothness of the drinking yogurt of the invention as well as the difference in the thickness compared to the reference yogurt preserved during the 3-weeks storage period.

There were no wheying-off or syneresis during the storage in the drinking yogurt of the invention.

Example 5

Production of Fat-Free Sour Milk from Microparticulated Ideal Whey Protein Concentrate The sour milk was prepared from skimmed milk (55%) and the microparticulated ideal whey protein preparation of Example 1 (45%). The skimmed milk was pasteurized at 90° C. for 5 minutes and then cooled to the temperature of about 20° C. The mesophilic starter culture (0.02%) was added and the raw material milk was acidified until the pH was 4.5. After the desired pH was reached, the mass was mixed and treated with YTRON rotor-stator mixer (30 Hz) and cooled to a temperature of about 10° C. The microparticulated ideal whey protein preparation was added and the product was packed and cooled to a temperature of about 5° C. in a cold storage.

The sour milk was full-flavored and creamy compared to the normal sour milk.

The sour milk of the invention was about 8 times thicker than the reference sour milk. After one week of storage, the viscosity of the sour milk of the invention was 120 mPas, whereas the viscosity of the normal sour milk is about 10-mPas. The richness/fullbodiness and smoothness of the sour milk of the invention as well as the difference in the thickness compared to the normal sour milk preserved during the 2-weeks storage period.

There were no wheying-off or syneresis during the storage in the sour milk of the invention.

Example 6

Production of Fat-Free Yogurt from Microparticulated Ideal Whey Protein Concentrate The yogurt was prepared from skimmed milk (72.2%) and the microparticulated ideal whey protein preparation of Example 1 (27.8%). The skimmed milk and the microparticulated ideal whey protein preparation were mixed and pasteurized at 90° C. for 5 minutes and then cooled to the temperature of about 42° C. The starter culture YF-L901 from Chr. Hansen (0.02%) was added and the raw material was acidified until the pH was 4.5. After the desired pH was reached, the mass was mixed and treated with YTRON-mixer (30 Hz) and cooled to a temperature of about 20° C. The product was packed and cooled to a temperature of about 5° C. in a cold storage.

The yogurt of the invention was creamy, whereas the reference yogurt of Example 2 had a watery, not creamy, taste. The yogurt of the invention was thicker than the reference yogurt of Example 2. The richness of the yogurt of the invention as well as the difference in the thickness compared to the reference yogurt preserved during the 3-weeks storage period.

Example 7

Production of Fat-Free Yogurt from Microparticulated Ideal Whey Protein Concentrate The yogurt was prepared from skimmed milk (72.2%) and the microparticulated ideal whey protein preparation of Example 1 (27.8%).

The skimmed milk was pasteurized at 90° C. for 5 minutes and then cooled to the temperature of about 42° C. The microparticulated ideal whey protein preparation and the starter culture YF-L901 from Chr. Hansen (0.02%) were added and the raw material was acidified until the pH was 4.5. After the desired pH was reached, the mass was mixed and treated with YTRON rotor-stator mixer (30 Hz) and cooled to a temperature of about 20° C. The product was packed and cooled to a temperature of about 5° C. in a cold storage.

The yogurt was full-flavored and creamy whereas the reference yogurt of Example 2 had a watery, not creamy, taste.

The yogurt of the invention was thicker than the reference yogurt. After one week of storage, the viscosity of the yogurt of the invention was 982 mPas, whereas the viscosity of the reference yogurt was 185 mPas. The richness and smoothness of the yogurt of the invention as well as the difference in the thickness compared to the reference yogurt preserved during the 3-weeks storage period.

Example 8

Production of Microparticulated Ideal Whey Protein Preparation by Cavitation

Ideal whey protein solution (protein 9%) was preheated to a temperature of 61° C. and run through an APV cavitator (SPX, USA) using operating values 52 Hz and 200 l/h, cavitation-time 30 s. The counterpressure of the device was 8 bar, wherein the device was made to cavitate in a controlled way. The cavitator has a spinning cylider which has holes in four lines and a clearance of 3 mm. During the cavitation the temperature rose up to 78° C.

In the cavitator, the spinning action generates friction internally in the liquid and the holes generate hydrodynamic cavitation.

After this, the microparticulated ideal whey was cooled to a temperature of 4° C. using a scraped-surface heat exchanger.

As a result, a thick/viscous light brownish microparticulated ideal whey protein preparation having particle size of 1-200 μm was achieved. The taste of the microparticulated ideal whey protein preparation was full-flavored. Texture was smooth.

Figure 2:
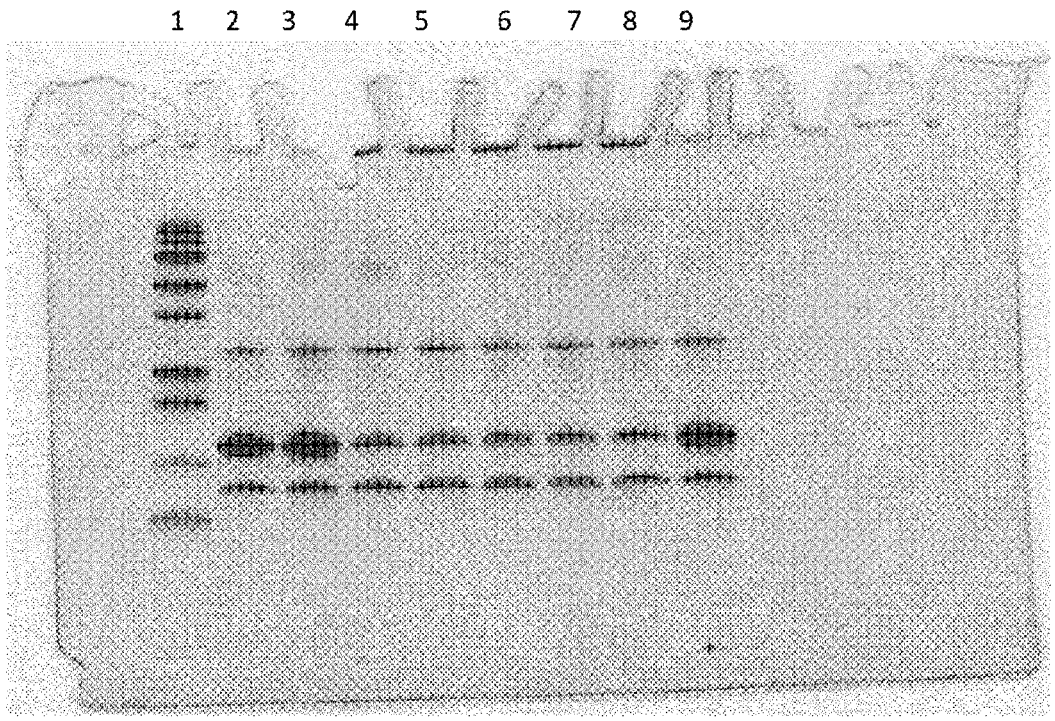
FIG. 2 shows SDS-PAGE-results of different microparticulated ideal whey proteins.
Line 1 shows the bands of Bio-Rad #161-0373-standard.
Line 2 shows the bands of an ideal whey protein.
Line 3 shows the bands of an ideal whey protein concentrate microparticulated with APV-cavitator (SPX, USA and having β-LG denaturation degree of 79.8%.
Line 4 shows the bands of an ideal whey protein concentrate microparticulated with APV-cavitator (SPX, USA) and having β-LG denaturation degree of 93.6%.
Lines 5 and Line 6 show the bands of an ideal whey protein concentrate microparticulated by cavitation using APV-cavitator (SPX, USA) and having β-LG denaturation degree of 93.7%.
Line 7 shows the bands of an ideal whey protein concentrate microparticulated by cavitation using APV-cavitator (SPX, USA) and having β-LG denaturation degree of 94.6%.
Line 8 shows the bands of an ideal whey protein concentrate microparticulated by cavitation using APV-cavitator (SPX, USA) and having β-LG denaturation degree of 91.6%.
Line 9 shows the bands of an ideal whey protein concentrate microparticulated by cavitation using APV-cavitator (SPX, USA) and having β-LG denaturation degree of 77.9%.

Based on the results of SDS-PAGE, it can be seen that a part of β-lactoglobulin has polymerized into polymers having a size of >200 kDa (FIG. 2, line 8). Furthermore, the denaturation degree of β-lactoglobulin was 91.6%.

Example 9

Production of Fat-Free Set-Type Yogurt from Microparticulated Ideal Whey Protein Concentrate The yogurt was prepared from skimmed milk (72.2%) and the microparticulated ideal whey protein preparation of Example 1 (27.8%). The skimmed milk and the microparticulated ideal whey protein preparation were mixed and pasteurized at 90° C. for 5 minutes and then cooled to the temperature of about 42° C. The starter culture YF-L901 from Chr. Hansen (0.02%) was added and the raw material was packed to cups. The product was acidified at 42° C. until the pH was 4.5. After the desired pH was reached, the product was cooled to a temperature of about 5° C.

The yogurt of the invention was creamy and the hardness of the set-type yogurt was 3000 g·mm. The richness of the yogurt of the invention as well as the hardness of the yogurt preserved during the 3-weeks storage period.

Example 10

Preparation of Ideal Whey Protein Preparation

Skim milk was microfiltered with polymeric microfiltration membranes of 800 kDa (Synder FR-3A-6338) at 10° C. The obtained microfiltration permeate was concentrated by ultrafiltration with an ultrafiltration membrane of 10 kDa (Koch HFK-131 6438-VYT) and with a concentration factor of 36 at 10° C. to provide an ideal whey protein solution/preparation as an ultrafiltration retentate. The protein content of the ideal whey solution was 9%. β-casein content is about 20% based on total protein.

It will be obvious to a person skilled in the art that, as the technology advances, the inventive concept can be implemented in various ways. The invention and its embodiments are not limited to the examples described above but may vary within the scope of the claims.

What is claimed is:

1. A dairy product, comprising:
   a microparticulated ideal whey protein preparation, the microparticulated ideal whey protein preparation being a thickening agent for the dairy product;
   wherein the amount of the microparticulated ideal whey protein preparation in the product is 10-50% based on the weight of the product;
   wherein the dairy product has a hardness of 1000-4000 g·mm;
   wherein the dairy product has a viscosity, and (a) the viscosity is 100-250 mPas and the dairy product is drinkable, (b) the viscosity is 200-4000 mPas and the dairy product is a yogurt, or (c) the dairy product is sour milk;
   wherein the dairy product is produced from skimmed milk and the microparticulated ideal whey protein preparation; and
   wherein the microparticulated ideal whey protein preparation is free from caseinomacropeptides and comprises microparticulated whey proteins and β-lactoglobulin polymers having a size of >200 kDa.

2. The dairy product of claim 1, wherein the microparticulated ideal whey protein preparation partially or fully substitutes for pectin, guar gum, xanthan gum, gum arabic, and gellan gum.

3. The dairy product of claim 1, wherein the dairy product lacks thickening agents other than the microparticulated ideal whey protein preparation.

4. The dairy product of claim 1, wherein the amount of the microparticulated ideal whey protein preparation in the product is 20-30% based on the weight of the product.

5. The dairy product of claim 1, wherein the dairy product has a hardness of 2000-3000 g·mm.

6. The dairy product of claim 1, wherein the viscosity is 100-250 mPas and the dairy product is drinkable.

7. The dairy product of claim 1, wherein the dairy product is a yogurt with a viscosity of 200-4000 mPas.

8. The dairy product of claim 7, wherein the viscosity is 500-2000 mPas.

9. The dairy product of claim 1, wherein the dairy product has neither wheying-off nor syneresis during a storage period of at least 2 weeks.

10. The dairy product of claim 1, wherein the dairy product has neither wheying-off nor syneresis during a storage period of at least 3 weeks.

11. The dairy product of claim 1, wherein the dairy product has a viscosity higher than a dairy product produced without the microparticulated ideal whey protein preparation.

12. The dairy product of claim 1, wherein a viscosity of the dairy product is maintained during a storage period of at least 3 weeks.

13. The dairy product of claim 1, wherein the microparticulated ideal whey protein preparation contains microparticulated whey proteins having a particle size of about 1-200 μm.

14. The dairy product of claim 13, wherein the microparticulated ideal whey protein preparation contains microparticulated whey proteins having a particle size of about 1-10 μm.

15. The dairy product of claim 13, wherein the polymerization level of β-lactoglobulin in the microparticulated ideal whey protein preparation is at least 30%.

16. The dairy product of claim 15, wherein the microparticulated ideal whey protein preparation contains 5.0 to 8.0 g β-lactoglobulin/100 g.

17. The dairy product of claim 15, wherein the microparticulated ideal whey protein preparation contains at most 2.0 g α-lactalbumin/100 g.

18. The dairy product of claim 13, wherein the microparticulated ideal whey protein preparation partially or fully substitutes for pectin, guar gum, xanthan gum, gum arabic, and/or gellan gum that otherwise would be present to thicken the dairy product.

19. The dairy product of claim 1, wherein the dairy product is treated with an acidifying agent during its production.

20. The dairy product of claim 19, wherein the acidifying agent has a pH less than 7.

21. The dairy product of claim 19, wherein the dairy product is reduced fat or fat-free.

22. The dairy product of claim 1, wherein the dairy product is reduced fat or fat-free.

* * * * *